(12) United States Patent
Yan

(10) Patent No.: US 7,215,042 B2
(45) Date of Patent: May 8, 2007

(54) INTERFACE FOR PERIPHERAL DEVICE DETECTION

(75) Inventor: Yu-Hu Yan, Taiping (TW)

(73) Assignee: Benq Corporation, Taoyuan (TW)

( * ) Notice: Subject to any disclaimer, the term of this patent is extended or adjusted under 35 U.S.C. 154(b) by 351 days.

(21) Appl. No.: 10/838,760

(22) Filed: May 4, 2004

(65) Prior Publication Data

US 2004/0230733 A1 Nov. 18, 2004

(30) Foreign Application Priority Data

May 14, 2003 (TW) .............................. 92113030 A

(51) Int. Cl.
*G06F 13/00* (2006.01)
*H05K 7/10* (2006.01)
*H01H 35/00* (2006.01)

(52) U.S. Cl. .................... 307/116; 710/301; 710/302

(58) Field of Classification Search ................ 710/301, 710/302; 307/116
See application file for complete search history.

(56) References Cited

U.S. PATENT DOCUMENTS 5,570,002 A * 10/1996 Castleman ................ 323/283
5,996,035 A * 11/1999 Allen et al. ................ 710/302
6,397,087 B1 * 5/2002 Kim et al. ................ 455/569.1
6,434,652 B1 * 8/2002 Bailis et al. ................ 710/302
6,948,020 B1 * 9/2005 Bonomo et al. ............ 710/300
2004/0219881 A1 * 11/2004 Kramp et al. .............. 455/41.2

FOREIGN PATENT DOCUMENTS

CN 2505913 Y 8/2002

OTHER PUBLICATIONS

China Patent Office Action, No Translation.

* cited by examiner

*Primary Examiner*—Robert L. Deberadinis
*Assistant Examiner*—Michael Rutland-Wallis
(74) *Attorney, Agent, or Firm*—Thomas, Kayden, Horstemeyer & Risley

(57) ABSTRACT

An interface for detecting connected peripheral devices. The interface comprises a jack and a control unit determining the power requirements of peripheral devices, the control unit detecting the potential of two specified nodes upon connection of the device. If power is required, the control unit supplies the power and performs related commands according to device identification received from the connection. If no power is required, the control unit measures a resistor-capacitor (RC) equivalent value inside the peripheral device, and compares the measured RC values with RC values in a database.

19 Claims, 4 Drawing Sheets

| Accesory | TX potential | Action after judging |
|---|---|---|
| 3-point kit (HF、DL) | 0V | Do not supply power, and measure the RC equivalent value |
| 4-point kit (DSC、MP3) | 0.6V | Supply power and requesting the response ID name |
| 4-point hand free headset (MIC) | 0.3V | Do not supply power, and measure the RC equivalent value |
| 4-point hand free headset (SPK) | 0V | Do not supply power, and measure the RC equivalent value |
| 4-point maltunction kit | 0V | Do not supply power, and measure the RC equivalent value |

FIG. 6

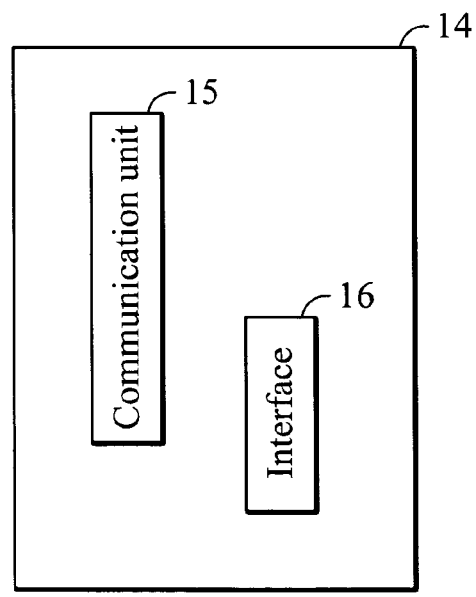

FIG. 7

INTERFACE FOR PERIPHERAL DEVICE DETECTION

BACKGROUND OF THE INVENTION

1. Field of the Invention

The present invention relates to interface detection, and more particularly to interface detection for connection of peripheral devices.

2. Description of the Related Art

Currently, electronic devices normally have simple connections with such peripheral devices as earphones. Peripheral devices, can involve complex design, increasing with variety of functions and requiring specialized connection. For example, data transmission, such as video or high quality audio, requires additional eight-or twelve-port connectors with more pins to interface with the electronic device, increasing the size of the connectors, the cost, including shielding for pins, and others.

SUMMARY OF THE INVENTION

The object of the present invention is to provide a smaller interface with lower cost, for detecting connection of peripheral devices with a variety of functions, specifically for use with portable electronic devices.

For the purposes above, the present invention provides an interface unit in an electronic device, the interface unit for connecting a peripheral device and the electronic device. There is a plug on the peripheral device. The interface comprises a jack, a potential source and a control unit, wherein the jack comprises a detection node, a transmission node, a receiving node, a power source node, and a ground node. Receiving a notification signal from the detection node of the jack when the plug plugging into the electronic device, the control unit measures the voltage potential level between the transmission node and the power source node. The control unit determines if the peripheral device need power supplying. Power is supplied by the power source when the power source node coupling to the power source.

In addition, the interface is suitable for installation in a portable electronic device comprising a communication unit.

BRIEF DESCRIPTION OF THE DRAWINGS

The present invention can be more fully understood by reading the subsequent detailed description in conjunction with the examples and references made to the accompanying drawings, wherein:

FIG. 6 is a list of sample devices' voltage differences;

FIG. 7 shows a relationship between the interface of the present invention and a communication unit in a portable electronic device.

DETAILED DESCRIPTION OF THE INVENTION

Figure 1:
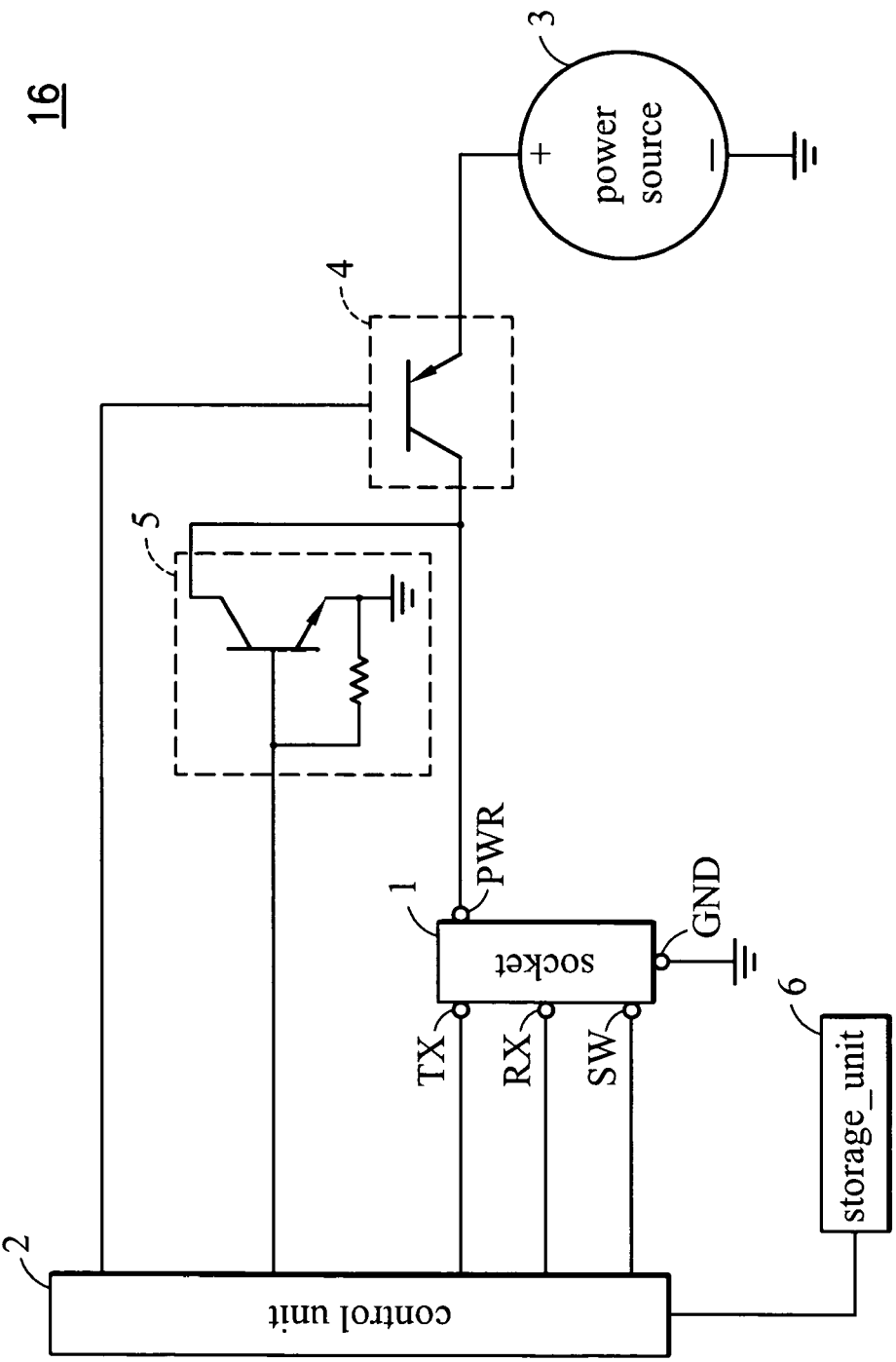
FIG. 1 shows the interface unit of the present invention.

The object of the present invention is to provide an interface unit 16 for detecting a peripheral device. In FIG. 1, interface unit 16 comprises a jack 1, a potential source 3 and a control unit 2 (central processing unit, CPU, here), wherein the jack 1 comprises a detection node SW, a transmission node TX, a receiving node RX and a power source node PWR. Receiving a notification signal from detection node SW of the jack 1, when the jack 1 connecting with the peripheral device, the control unit 2 measures the potential between transmission node TX and the power source node PWR to determine the power requirements of the peripheral device. If power supply is required, the control unit connects the potential source node 3 with the power source node PWR. In addition, the control unit 2 outputs a first signal (low potential) to activate switch 4 (bipolar transistor of the present invention) and couple the power source node PWR with the potential source 3. Jack 1 further comprises a reference node GND coupled with a reference ground. After receipt of a notification, control unit 2, to retrieve the potential between the transmission node TX and the power source node PWR by measuring the transmission node TX, outputs a second signal (high potential) to activate second switch 5 (bipolar transistor of the present invention) and ground the power source node PWR. After determining the power requirements of the peripheral device, control unit 2 outputs a third signal (low potential) to deactivate the switch 5.

Figure 2:
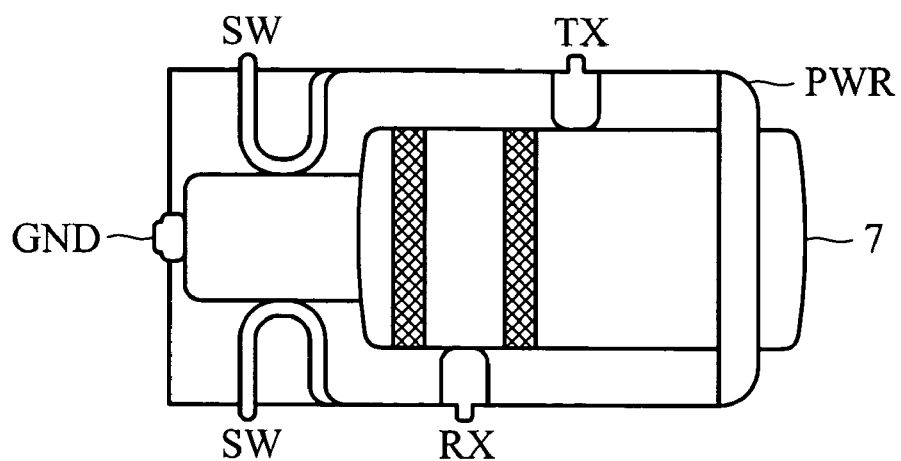
FIG. 2 shows a 3-port connector connected to the jack of the present invention.
Figure 3:
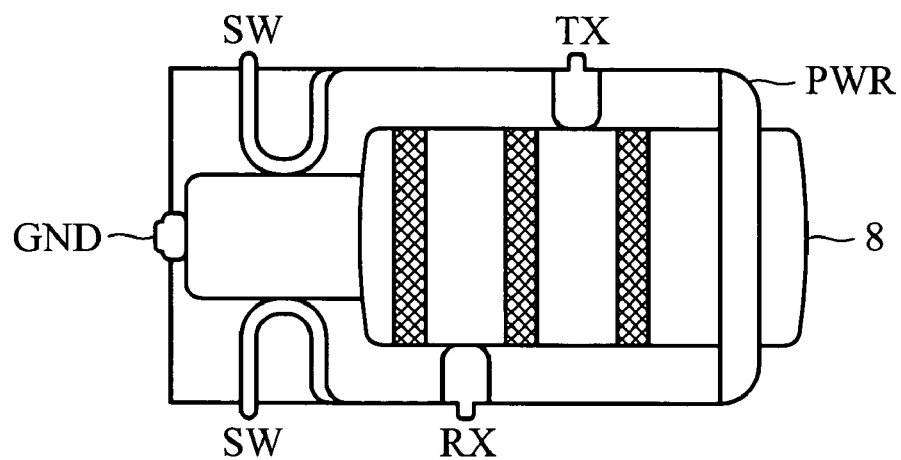
FIG. 3 shows a 4-port connector connected to the jack of the present invention.

FIG. 2 shows a 3-port plug 7 of a handsfree phone set, and a 4-port plug 8 of a digital camera shown in FIG. 3. After the two plugs are plugging into the jack 1, the detection node SW connects with the reference node GND and outputs a grounded potential as a notification to control unit 2. If no power is returned, the control unit 2 measures potential at transmission node TX at three specific times, and calculates equivalent resistor-capacitor (RC) value inside the peripheral device by "V (in the TX node)=V (the initial voltage of discharge)* $e^{-t/RC}$". If measured potentials show no capacitance, the control unit 2 compares the calculated RC value with the RC value inside the storage unit 6. For example, if the control unit 2 switches to handsfree phone set, the portable electronic device executes the corresponding commands.

FIG. 6 shows a reference data table for device behavior in the control unit 2. The control unit 2, to determine power requirements of the peripheral device, compares the potential between the transmission node TX and the power source node PWR with the reference data table.

Figure 4:
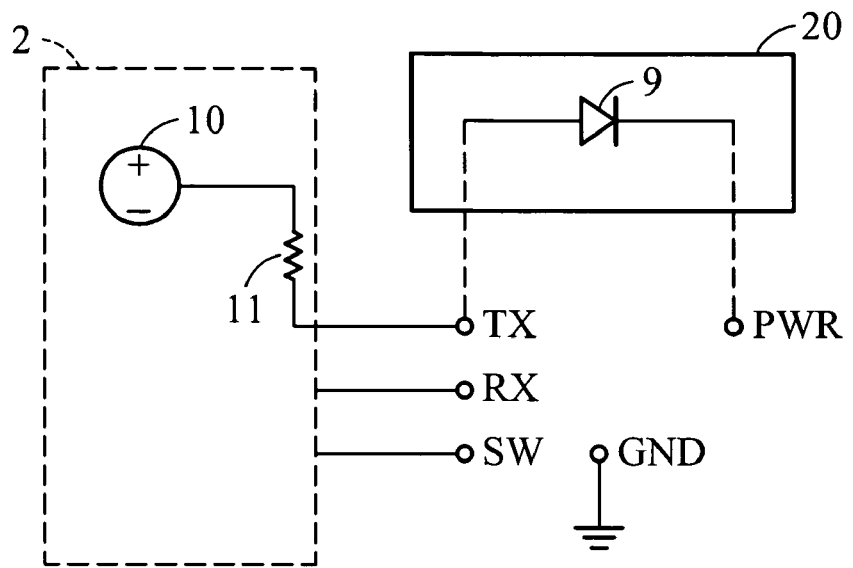
FIG. 4 shows the measured potential at transmission node (TX) of the present invention.
Figure 5:
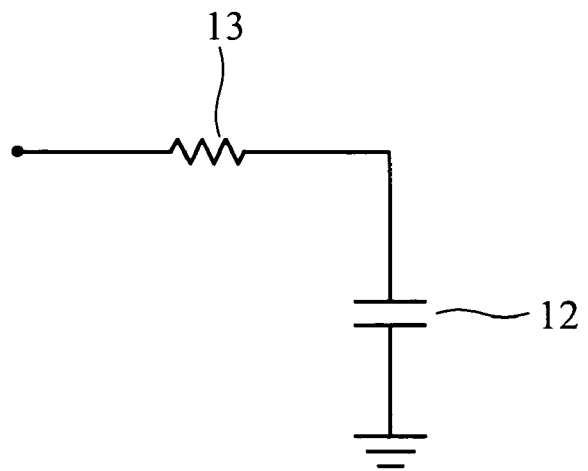
FIG. 5 shows the resistance-capacitor equivalent circuit inside a peripheral device.

FIG. 4 shows the control unit 2, comprising a potential source 10 and a resistance 11 for outputting the divided potential to the transmission node TX, and the transmission node TX coupled with the power source node PWR through the response circuit 20 (a diode 9 of the present invention) installed inside the peripheral device upon connection. Hence, according to the fixed potential on the response circuit 20, the control unit 2 determines power requirements and identifies the peripheral device. For example, if the measured potential of the diode 9 is 0.6V, the control unit 2 compares the 0.6V with the potential of the storage unit 6 and supplies power to a 4-port accessory.

After determining the power requirements, the control unit 2 transmits with asynchronous transmission (UART) mode.

If no identification is received after a specified time, the control unit, to removing power source 3 of the present invention, outputs a signal (low potential) to deactivate the first switch 4.

FIG. 7 shows that a portable electronic device 14 (a handset here), comprising a communication unit 15, and interface 16, connecting and identified any peripheral devices present. Interface 16 is suitable for use with portable electronic device 14. For example, if connected to an MP3 device, the communication device 14 immediately switches to MP3 mode and performs related functions.

What is claimed is:

1. An interface unit in an electronic device for connecting the electronic device and a peripheral device, the peripheral device having a plug, the interface unit comprising:
   a jack comprising a detection node, a transmission node and a power source node, the detection node sending a notification signal when the plug plugging into the jack;
   a power source for supplying power to the peripheral device;
   a control unit, when the control unit receiving the notification signal, the control unit determining the power requirements of the peripheral device according a potential level between the transmission node and the power source node, wherein, if there is no power requirement for the peripheral device, the control unit measures a first resistor-capacitor (RC) value in the peripheral device through the transmission node and the power source node for peripheral device type detection; and
   a storage unit for storing first data;
   wherein the control unit compares the first RC value with the first data for peripheral device type detection and couples the power source node to the power source if the peripheral device requires power.

2. The interface unit as claimed in claim 1, the interface unit further comprises a first switch connecting the power source node and the power source, and the control unit sending a first signal to activate the first switch if the peripheral device requires power.

3. The interface unit as claimed in claim 1, wherein the jack further comprises a reference node coupled with a reference ground.

4. The interface unit as claimed in claim 3, wherein the detection node connects to the reference node through the plug when the plug plugging into the jack and sending a reference potential level as the notification signal.

5. The interface unit as claimed in claim 1, the interface unit further comprises a second switch connecting the power source node and reference node, when the plug plugging into the jack, the second switch activated by a second signal from the control unit, when the control unit having determined the power requirements of the device, the control unit outputting a third signal.

6. The interface unit as claimed in claim 1, the interface further comprises a storage unit for storing the specified potential range corresponding to the peripheral device, when the first potential level is in the specified potential range, the control unit determining the power requirements of the peripheral device.

7. The interface unit as claimed in claim 6, wherein the transmission node (TX) is coupled with a constant potential source.

8. The interface unit as claimed in claim 7, wherein the peripheral device further comprises a response circuit, when the plug plugging into the jack, the response circuit coupling to the transmission node and the power source node and outputting the first potential level.

9. The interface unit as claimed in claim 8, wherein the response circuit comprises a diode.

10. The interface unit as claimed in claim 1, wherein the jack further comprises a receiving node, the power source coupling to the power source node, the receiving node getting a type of the peripheral device by the peripheral device.

11. The interface unit as claimed in claim 10, wherein, after a specified time, the receiving node receiving no signal from the peripheral device, removing the power source from the potential source node.

12. An electronic device for connecting a peripheral device, the peripheral device having a plug, the electronic device comprising:
   a jack comprising a detection node, a transmission node, a receiving node and a power source node, the detection node sending signal when the plug plugging into the jack;
   a power source for supplying power to the peripheral device;
   a control unit, when the control unit receiving the notification signal, the control unit determining the power requirements of the peripheral device according a first potential level between the transmission node and the power source node, wherein, if there is no power requirement for the peripheral device, the control unit measures a first resistor-capacitor (RC) value in the peripheral device through the transmission node and the power source node for peripheral device type detection; and
   a storage unit for storing first data;
   wherein the control unit compares the first RC value with the first data for peripheral device type detection and couples the power source node to the power source if the peripheral device requires power.

13. The electronic device as claimed in claim 12, further comprising a first switch connecting the power source node and the power source, and the control unit sending a first signal to activate the first switch if the peripheral device requires power.

14. The electronic device as claim in claim 12, further comprising a communication unit for executing corresponding communication commands when the peripheral device is a handsfree phone set.

15. The electronic device as claimed in claim 12, further comprising a second switch connecting the power source node and reference node, when the plug plugging into the jack, the second switch activated by a second signal from the control unit, when the control unit having determined the power requirements of the device, the control unit outputting a third signal.

16. The electronic device as claimed in claim 12, wherein the transmission node (TX) is coupled with a constant potential source.

17. The electronic device as claimed in claim 16, wherein the peripheral device comprises a response circuit, when the plug plugging into the jack, the response circuit coupling to the transmission node and the power source node and outputting the first potential level.

18. The electronic device as claimed in claim 17, wherein the response circuit comprises a diode.

19. The electronic device as claimed in claim 12, wherein the jack further comprises a receiving node, the power source coupling to the power source node, the receiving node getting a type of the peripheral device by the peripheral device.

* * * * *